United States Patent [19]

Dinger et al.

[11] 4,388,802
[45] Jun. 21, 1983

[54] INTERNAL COMBUSTION ENGINE

[75] Inventors: Hans Dinger, Friedrichshafen; Helmut Klotz, Tettnang, both of Fed. Rep. of Germany

[73] Assignee: MTU Motoren-und Turbinen-Union Friedrichshafen GmbH, Fed. Rep. of Germany

[21] Appl. No.: 289,837

[22] Filed: Aug. 4, 1981

[30] Foreign Application Priority Data

Dec. 12, 1980 [DE] Fed. Rep. of Germany ....... 3046875

[51] Int. Cl.³ .............................................. F02B 37/00
[52] U.S. Cl. ......................................... 60/606; 60/612
[58] Field of Search .................................. 60/606, 612

[56] References Cited

U.S. PATENT DOCUMENTS 4,299,090 11/1981 Deutschmann ..................... 60/606

FOREIGN PATENT DOCUMENTS 2809202 9/1979 Fed. Rep. of Germany ........ 60/612
2855551 7/1980 Fed. Rep. of Germany ........ 60/612
2005765 4/1979 United Kingdom .................. 60/612

Primary Examiner—Douglas Hart
Attorney, Agent, or Firm—Craig & Burns

[57] ABSTRACT

An internal combustion engine which is adapted to be supercharged by at least two exhaust gas turbochargers operating in parallel. The engine includes an auxiliary combustion chamber, the exhaust gas of which is temporarily fed to a turbine of an exhaust gas turbocharger for improving an acceleration characteristic of the internal combustion engine. Combustion air for an idling operation of the auxiliary combustion chamber is derived from a stream of supercharging air produced by the exhaust gas turbocharger. During a partial load operation of the engine, only one of the exhaust gas turbochargers is supplied with an entire volume of the exhaust gas of the internal combustion engine to provide the supply of supercharging air. The exhaust gas from the auxiliary combustion chamber, operated with a full load for the case of accelerating in a lower load range of operation of the internal combustion engine, is fed to the turbine of the other exhaust gas turbocharger. A compressor associated with the other exhaust gas turbocharger yields the combustion air for a full load operation of the auxiliary combustion chamber.

5 Claims, 2 Drawing Figures

INTERNAL COMBUSTION ENGINE

The present invention relates to an internal combustion engine and, more particularly, to a supercharged internal combustion engine which includes exhaust gas turbochargers and an auxiliary combustion chamber, with an exhaust gas of the auxiliary combustion chamber being temporarily fed to a turbine of an exhaust turbocharger for improving an acceleration characteristic of the internal combustion engine, and with combustion air for an idling operation of the auxiliary combustion chamber being derived from a stream of supercharging air produced by the exhaust gas turbocharger.

For the purpose of improving acceleration characteristics of internal combustion engines, two different systems have been proposed with an operating principle of these systems residing in the fact that an energy content of the exhaust gas stream, produced by the internal combustion engine during idling or low partial load, is raised prior to entering the turbine of the exhaust gas turbocharger. By means of the exhaust gas, which is higher in energy, a rapid increase in the number of revolutions of the exhaust turbocharger and/or a rapid pressure buildup in the supercharging air system of the internal combustion engine is attained.

In one of the above-noted proposed systems, the exhaust gas of the internal combustion engine flow through an auxiliary combustion chamber and, in the auxiliary combustion chamber, the temperature and quantity of the exhaust gas are increased by feeding fuel combusting with the use of residual oxygen contained in the exhaust gas. A disadvantage of this proposed system resides in the fact that the combustion characteristic of the auxiliary combustion chamber is unstable due to the pulsating exhaust gas stream from the internal combustion engine and, consequently, may even lead to an extinction of the auxiliary combustion chamber.

In the other above-noted proposed system, the auxiliary combustion chamber is not fed with exhaust gas but rather with combustion air branched off from the supercharging air stream for the internal combustion engine as well as with fuel. The hot gas produced in the auxiliary combustion chamber is then admixed to the exhaust gas stream from the internal combustion engine prior to entrance into the turbine of the exhaust gas turbocharger. While this system makes it possible to execute a stable operation of the auxiliary combustion chamber and appreciably improves the acceleration characteristic of the internal combustion engine, a grave disadvantage of this system resides in the fact with optimum adaptation of the system, that is, internal combustion engine plus auxiliary combustion chamber, the normal operation of the internal combustion engine without support by the auxiliary combustion chamber is very unsatisfactory.

The aim underlying the present invention essentially resides in providing a safely functioning system of a supercharged internal combustion engine with an auxiliary combustion chamber, which system significantly improves the acceleration characteristics of the internal combustion engine.

In accordance with advantageous features of the present invention, an internal combustion engine is provided with two exhaust gas turbochargers operating in parallel, with only one of the turbochargers being supplied, during partial load, with the entire exhaust gas of the internal combustion engine to provide the supply of supercharging air. The exhaust gas from the auxiliary combustion chamber, operated with full load for the case of accelerating in a lower load range of the internal combustion engine, is fed to the turbine of the other exhaust gas turbocharger, and a compressor associated therewith yields the combustion air for the full-load operation of the auxiliary combustion chamber.

Advantageously, in accordance with further features of the present invention, an air feed to the internal combustion engine from the other exhaust gas turbocharger, driven by the exhaust gases of the auxiliary combustion chamber, is interrupted.

By virtue of the above-noted features of the present invention, only a small auxiliary combustion chamber is required, with a concomitantly low fuel consumption.

In accordance with still further features of the present invention, a partial amount of combustion air is branched off from the combustion air for the auxiliary combustion chamber to supply supercharging air to the internal combustion engine.

In accordance with yet further features of the present invention, during operation of the internal combustion engine in its upper load range the auxiliary combustion chamber is supplied with an amount of combustion air which is sufficient for a readiness operation.

By the branching off of a partial amount of combustion air and the supplying of an amount of combustion air which is efficient for a readiness operation, it is possible to provide an even further shortened acceleration time as compared with previously proposed systems.

Moreover, the advantages attained by the present invention, as compared with a supercharged internal combustion engine without an auxiliary unit, reside in a marked reduction in a time span required for accelerating the internal combustion engine from an idling to a full load. Moreover, it becomes possible to operate the auxiliary combustion chamber without any influence being exerted by the exhaust gas pulsation of the internal combustion engine.

Furthermore, by virtue of the present invention, a trouble spot represented heretofore by a convergence of the exhaust gases from the internal combustion engine and the auxiliary combustion chamber which adversely affected the exhaust gas flow is eliminated and a manifold for the exhaust gases of the internal combustion engine may be fashioned for an optimum flow conductance.

Accordingly, it is an object of the present invention to provide a supercharged internal combustion engine which avoids, by simple means, shortcomings and disadvantages encountered in the prior art.

Another object of the present invention resides in providing a supercharged internal combustion engine which improves the acceleration characteristics of the engine.

Yet another object of the present invention resides in providing a supercharged internal combustion engine which safely functions during all operating or load ranges.

A still further object of the present invention resides in providing an internal combustion engine which is simple in construction and therefore relatively inexpensive to manufacture.

These and other objects, features and advantages of the present invention will become more apparent from the following description when taken in connection with the accompanying drawing which shows, for the purposes of illustration only, two embodiments in accordance with the present invention, and wherein.

Figure 1:
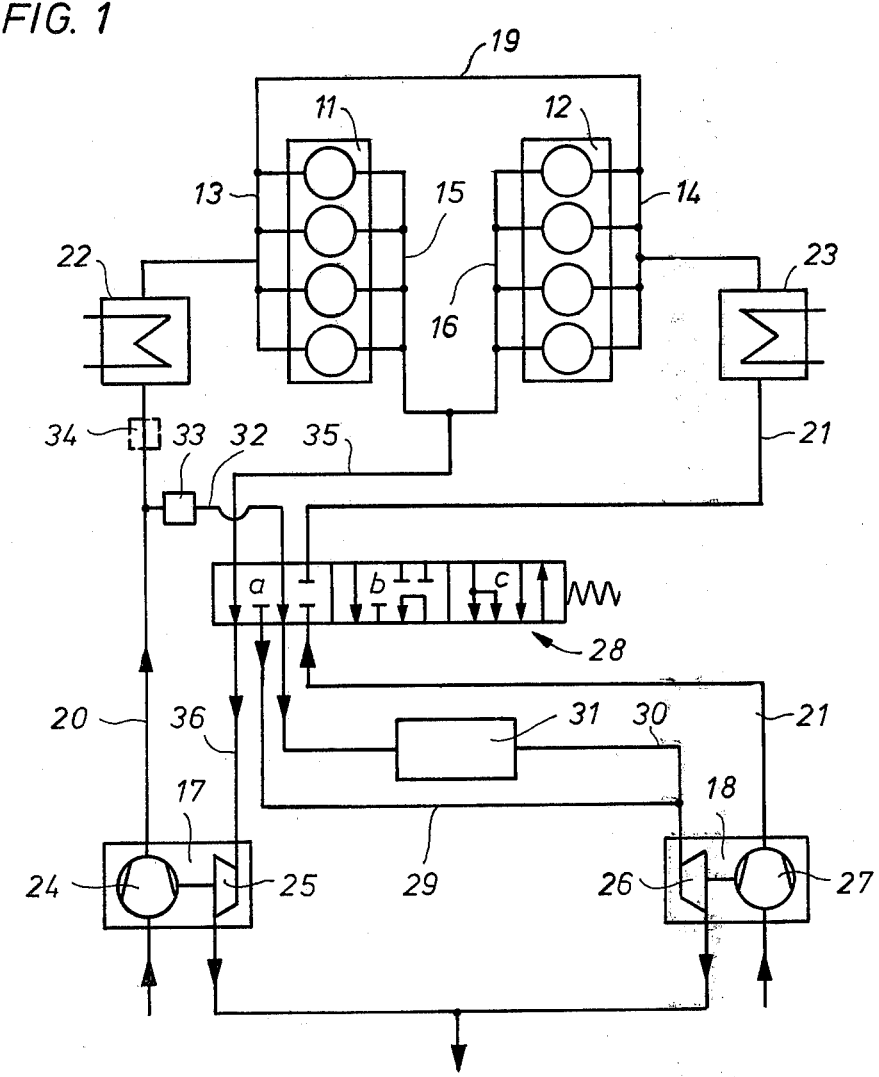
FIG. 1 is a schematic view of an internal combustion engine constructed in accordance with the present invention provided with two exhaust gas turbochargers.

Referring now to the drawings wherein like reference numerals are used in both views to designate like parts and, more particularly, to FIG. 1, according to this figure, an internal combustion engine is provided with two rows of cylinders 11, 12, with each row 11, 12, respectively being provided with an exhaust gas conduit or duct 15, 16 respectively supplied with precompressed supercharging air by means of exhaust gas turbochargers 17, 18. An overflow or crossover line 19 is provided for connecting the supercharging air conduits 13, 14 to each other. Air coolers 22, 23 are respectively disposed in supercharging air supply lines 20, 21 at a position forwardly of the air conduits 13, 14. The air supply lines 20, 21 respectively extend from compressors 24, 27 of the exhaust gas turbochargers 17, 18. Exhaust gases are supplied from the engine through exhaust gas ducts 15, 16 to the turbines 25, 26 of the exhaust gas turbochargers 17, 18.

A switchover or changeover unit generally designated by the reference numeral 28 is interposed between the exhaust gas ducts and the respective exhaust gas turbochargers 17, 18. The switchover unit 28 is displaceable between switching positions "a", "b" and "c". An exhaust line 30 of an auxiliary combustion chamber 31 is connected to an exhaust duct section 29 leading to the turbine 26. Combustion air necessary for ignition is fed to the auxiliary combustion chamber 31 through a conduit 32 which branches off from the supercharging air supply line 20 with the supply being controlled by the switchover unit 28. The supercharger air supply line 21 extending from the exhaust gas turbocharger 18 is likewise extended or controlled by way of the switchover unit 28.

A control device 33 is provided for regulating the stream of combustion air for the auxiliary combustion 31. The control device 33 is adjustable so as to provide a zero feeding of the stream of combustion air to the combustion chamber 31. The control device 33 is arranged at least in a conduit 32. The control device may be additionally supported by a further control device 34 arranged in the supercharging air feed line 20.

During a normal operation when the internal combustion engine operates at a low or idling load, the switchover unit 28 is in the position "a" and closed control device 33 blocks the feeding of air to the auxiliary combustion chamber 31. The exhaust gas of the internal combustion engine is conveyed through exhaust gas ducts 15, 16 and conduits 35 and 36 only to the exhaust gas turbocharger 17 which alone takes care of the supply of supercharging air to the internal combustion engine by the compressor 24 and supercharging air supply line 20.

For an impending instance of acceleration, i.e., if it can be foreseen that the internal combustion engine must be ready for a rapid increase in the rotational speed from idling or from a partial load condition, the auxiliary combustion chamber 31 is ignited after an opening of the control device 33, at the position "a" of the switchover unit 28. The auxiliary combustion chamber 31 is first operated at a low power and the exhaust gas from the auxiliary combustion chamber 31 is conducted through conduit 30 to the turbine 26 of the exhaust gas turbocharger 18. Due to an interruption in the air feed line 21 in the switchover unit 28 at the position "a" of the switchover unit 28, the compressor 27 is inoperative and the exhaust gas turbocharger 18 will thus assume a higher number of revolutions under the effect of the exhaust gas from the auxiliary combustion chamber 31.

Once the instant has arrived at which the internal combustion engine is to accelerate, the switchover unit 28 is shifted or displaced into the position "b" so that the auxiliary combustion chamber 31 is separated from the air feed by compressor 24 and switched over to the air supply by compressor 27. The auxiliary combustion chamber 31, now operated at an increased power, then cooperates with the exhaust gas turbocharger 18 in a gas turbine process in a "self-holding" mode. The auxiliary combustion chamber 31 is operated with such power that the exhaust turbocharger 18 reaches a speed equal to or higher than the rotational speed or number of revolutions of the exhaust gas turbocharger 17 operated by the exhaust gas of the internal combustion engine. At the same time, the internal combustion engine is operated with full load for accelerating purposes, wherein the exhaust gas of all cylinders continue to be fed to the exhaust gas turbocharger 17. The exhaust gas turbocharger 17 is thereby acted upon out of its idling speed by a substantially larger mass stream of exhaust gas then it would receive during a normal "two-exhaust-turbocharger operation". Thus, the number of revolutions of rotational speed and supercharging pressure of the turbocharger 17 will increase correspondingly more rapidly. With the supercharging pressure being increased, the internal combustion engine is capable of processing a large amount of fuel per operating cycle or stroke then possible in a normal operation at a specific speed however, due to this fact, a transmitted torque of the internal combustion engine likewise lies, so to speak, at a higher level then during a normal operation. With increased speed an exhaust gas production of the internal combustion engine, the exhaust gas turbocharger 17 reaches its capacity so that the second exhaust gas turbocharger 18 must likewise be connected in order to be able to process the growing mass stream of exhaust gases from the internal combustion engine. For this purpose, the switchover unit 28 is shifted into position "c" and, in this phase of operation, the auxiliary combustion chamber is no longer required in a support of capacity and is thus extinguished or throttled back to a readiness position.

By a branching of the flow routes from the conduit 35 to the two conduits 29 and 36 within the switchover unit 28, the exhaust gas from the internal combustion engine is now fed to both exhaust gas turbochargers 17, 18. The exhaust gas turbocharger 18 is brought up to speed with the support from the auxiliary combustion chamber 31 and, at this point in time, need no longer be accelerated by the exhaust gas of the internal combustion engine thus, the exhaust gas turbocharger 18 may contribute, immediately after a switchover, substantially all of its output to the supercharging air supply for the internal combustion engine by way of the supercharging air supply or feed line 21 which is no longer interrupted in the switchover unit 28 when the unit is shifted to the position "c". In this manner, a drop in the number of revolutions during a switchover to the "two-exhaust-turbo-charger operation", which would otherwise occur by connection of a further exhaust gas consumer or load is avoided. The time span required for the internal combustion engine to complete an acceleration process from idling or small partial load is considerably shortened.

During a normal operation of the internal combustion engine, that is, without support by the auxiliary combustion chamber 31, the internal combustion engine is operated in the upper load range at a position "c" of the switchover unit 28. The control device 33 is then closed or opened only to such an extent that the auxiliary combustion chamber continues operation with the above-noted readiness power. Only when the auxiliary combustion chamber 31 is in the readiness power condition, with an exhaust gas production which is very low as compared with a full load operation, may the exhaust gas be fed from the exhaust gas conduit 30 into the exhaust gas conduit section 29. However, this does not impair the normal operation of the internal combustion engine.

Figure 2:
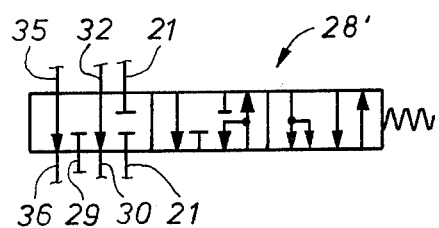
FIG. 2 is a schematic cross sectional view of a modification of a switchover unit for an internal combustion engine constructed in accordance with the present invention and provided with two exhaust gas turbochargers.

As shown in FIG. 2, for acceleration of the internal combustion engine, it is possible to provide in the construction of FIG. 1 a switchover unit generally designated by the reference numeral 28'. As shown in FIG. 2, with the switchover unit 28' in the position "b", it is possible to branch off a portion of air conveyed by the compressor 27 to the internal combustion engine thereby further improving the air supply for the internal combustion engine.

As can readily be appreciated, a combining of the exhaust gas conduits 15, 16 into a single line 35 upstream of the switchover unit 28 is not the only arrangement possible and, for example, the exhaust gas conduits 15, 16 may also be extended separately up to the switchover unit 28 and joined within the switchover unit 28 when the unit 28 is in the position "a" so as to supply the exhaust gases to the fed line 36 in combination. Thereby, the branching for the conduit routes for the exhaust gas from the internal combustion engine is then eliminated in the position "c" and, at the position "c" one flow route is respectively then provided in the switchover unit 28 for joining the exhaust gas conduit 15 with the feed line 36 and the exhaust gas conduit 16 with the conduit 29.

For the sake of clarity, the switchover unit 28 and 28' is illustrated as a closed or integrated unit; however, it is likewise possible to utilize respectively separate switchover devices for the conduits controlled by the switchover unit 28 or 28'.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An internal combustion engine comprising means for providing a supply of supercharging air for the engine, and an auxiliary combustion chamber means for improving an acceleration characteristic of the engine, characterized in that the supply means includes at least two exhaust gas turbocharger means operated in parallel, each of the turbocharger means includes a turbine means and a compressor means, means are provided for supplying an entire volume of exhaust gas from the engine only to one of the two turbocharger means during a partial load operation of the engine, means are provided for enabling the auxiliary combustion chamber means to operate at a full load during an accelerating of the engine in a low load range of operation of the engine, means are provided for supplying exhaust gas from the auxiliary combustion chamber means to the turbine means of the other of the two turbocharger means, and in that means are provided for enabling the compressor means of the other of the turbocharger means to supply supercharged combustion air for the full load operation of the auxiliary combustion chamber means.

2. An internal combustion engine according to claim 1, characterized in that means are provided for controlling a supply of a portion of supercharging air from one of the exhaust gas turbocharger means to the auxiliary combustion chamber means so as to enable an idling operation of the auxiliary combustion chamber means.

3. An internal combustion engine according to claim 2, characterized in that means are provided for interrupting a supply of supercharged combustion air from the other of the exhaust gas turbocharger means to the engine.

4. An internal combustion engine according to claim 3, characterized in that means are provided for branching off at least a portion of the combustion air supply to the auxiliary combustion chamber means to supply to portion of combustion air to the engine.

5. An internal combustion engine according to claim 2, characterized in that the means for controlling a supply of a portion of the supercharging air from one of the exhaust gas turbocharger means to the auxiliary combustion chamber means is adapted to supply the auxiliary combustion chamber means with a sufficient amount of combustion air to maintain the auxiliary combustion chamber means in a ready state during a full load operation of the engine.

* * * * *